United States Patent Office 3,705,187
Patented Dec. 5, 1972

3,705,187
PHENYL DERIVATIVES
Madhukar Subraya Chodnekar, Basel, Albert Pfiffner and Norbert Rigassi, Arlesheim, and Ulrich Schwieter, Reinach, Switzerland, assignors to Hoffmann-La Roche Inc., Nutley, N.J.
No Drawing. Filed Feb. 2, 1970, Ser. No. 8,055
Claims priority, application Switzerland, Feb. 14, 1969, 2,256/69
Int. Cl. C07c 69/76
U.S. Cl. 260—476 R          6 Claims

ABSTRACT OF THE DISCLOSURE

Benzene compounds substituted with an aliphatic side chain containing at least six carbon atoms wherein the side chain can contain epoxy groups, olefinic unsaturation or epithio groups which are useful in killing and preventing proliferation of insects by upsetting their hormone balance, said compounds being prepared by condensing a phenyl halide with an aliphatic aldehyde or ketone via a Grignard reaction.

SUMMARY OF THE INVENTION

In accordance with this invention, it has been found that compounds selected from the group consisting of:

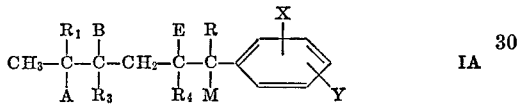           IA wherein Y is hydrogen or lower alkyl; X is halogen, formyl, carboxy, lower alkoxy carbonyl, lower alkenyloxy carbonyl, aryloxy carbonyl, aralkyloxy carbonyl, lower alkoxymethylene, lower alkenyloxymethylene, aryloxymethylene, aralkyloxymethylene or optionally lower alkyl substituted carbamyl; R is hydrogen or

$R_1$ is hydrogen, methyl, ethyl or isopropyl; $R_2$ and $R_3$ is hydrogen or methyl; $R_4$ is hydrogen or lower alkyl; A is hydrogen or halogen; M is hydrogen, hydroxy or halogen; and B, E and G are hydrogen; A taken together with B, and M taken together with either E or G forming a carbon to carbon bond, an oxygen bridge or a sulfur bridge, with the proviso that when X is substituted in the para position and $R_4$ is hydrogen, $R_1$, $R_2$ and $R_3$ taken all together have at least 2 carbon atoms;

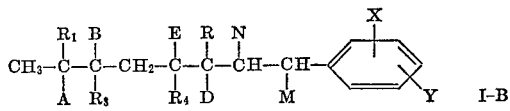        I-B wherein X, Y, R, $R_1$, $R_2$, $R_3$, and $R_4$ are as above; A, D and N are hydrogen or halogen, M is hydrogen, hydroxy or halogen, B, E and G are hydrogen, and A taken together with B, D taken together with either E or G, and M taken together with N form a carbon to carbon bond, an oxygen bridge or a sulfur bridge;

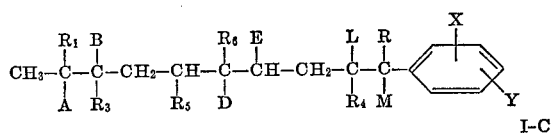        I-C wherein X, Y, R, $R_1$, $R_2$, $R_3$, and $R_4$ are as above; $R_5$ is hydrogen or lower alkyl; $R_6$ is hydrogen, methyl or ethyl; A and D are hydrogen or halogen; M is hydrogen, hydroxy or halogen; B, E, G and L are hydrogen, and A taken together with B, D taken together with E, and M taken together with either L or G form a carbon to carbon bond, an oxygen bridge, or a sulfur bridge; and

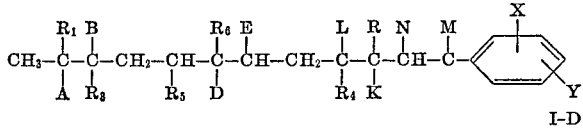       I-D wherein X, Y, R, $R_1$, $R_2$, $R_3$, $R_4$, $R_5$ and $R_6$ are as above; A, D, N and K are hydrogen or halogen, M is hydrogen, hydroxy or halogen, B, E, G and L are hydrogen, and A taken together with B, D taken together with E, K taken together with either L or G, and M taken together with N form a carbon to carbon bond, an oxygen bridge or a sulfur bridge; upset the hormone balance of pests such as insects, to prevent them from growing and reproducing.

Compounds of the Formula I-A, I-B, I-C and I-D are prepared by condensing a compound of the formula:

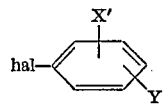   II wherein Y is as above; and X' is halogen or an acetalized aldehyde group; with an aldehyde or ketone selected from the group consisting of

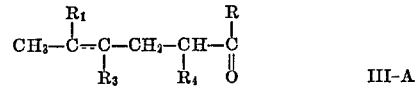       III-A wherein R, $R_1$, $R_3$ and $R_4$ are as above; and the bond drawn dotwise can optionally be hydrogenated;

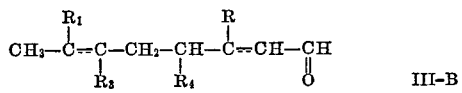       III-B wherein R, $R_1$, $R_3$ and $R_4$ are as above; and the bond drawn dotwise can optionally be hydrogenated;

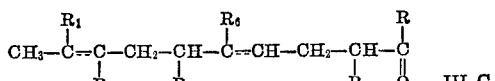      III-C wherein $R_1$, $R_3$, $R_4$, $R_5$ and $R_6$ are as above; and the bond drawn dotwise can optionally be hydrogenated; and

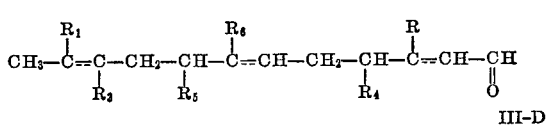       III-D wherein R, $R_1$, $R_3$, $R_4$, $R_5$ and $R_6$ are as above; and the bond drawn dotwise can optionally be hydrogenated; via a Grignard reaction.

As representative examples of the compounds manfacturable in accordance with the invention there can, for example, be named:

3-(p(-bromophenyl)-7-methyl-non-6-cis/trans-en-3-ol;
a mixture of 2-(p-bromophenyl)-6,10-dimethyl-dodeca-1,5-cis/trans, 9-cis/trans-triene and
2-(p-bromophenyl)-6,10-dimethyl-dodeca-2-cis/trans, 5-cis/trans, 9-cis/trans-triene;
p-(1-hydroxy-1,5-dimethyl-hept-4-cis/trans-enyl)-benzaldeheyde;
p-(1-hydroxy-1,5-dimethyl-hept-4-cis/trans-enyl)-benzoic acid methyl ester;
a mixture of p-[5-chloro-1-(cis/trans-ethylidene)-5-methyl-heptyl]-benzoic acid methyl ester and
p-[5-chloro-1-ethyl-5-methyl-hept-1-cis/trans-enyl]-benzoic acid methyl ester;

p-(1,5-dichloro-1-ethyl-5-methyl-heptyl)-benzoic acid methyl ester;
p-(1,5,9-trichloro-1,5,9-trimethyl-undecyl)-benzoic acid methyl ester;
p-(1,5-dichloro-1,5-dimethyl-heptyl)-benzoic acid methyl ester;
p-(1,5-dichloro-1,5-dimethyl-heptyl)-N,N-diethyl-benzamide;
a mixture of p-(5-methyl-1-methylene-hept-4-cis/trans-enyl)-N,N-diethyl-benzamide and
p-(1,5-dimethyl-hepta-1-cis/trans, 4-cis/trans-dienyl)-N,N-diethyl-benzamide;
a mixture of p-(4,5-epoxy-1-cis/trans-ethylidene-5-methyl-heptyl)-benzoic acid methyl ester and
p-(4,5-epoxy-1-ethyl-5-methyl-hept-1-cis/trans-enyl)-benzoic acid methyl ester;
a mixture of p-(4,5;8,9-diepoxy-5,9-dimethyl-1-methylene-undecyl)-benzoic acid methyl ester and
p-(4,5;8,9-diepoxy-1,5-trimethyl-undec-1-enyl)-benzoic acid methyl ester;
a mixture of p-(4,5-epithio-1-cis/trans-ethylidene-5-methyl-heptyl)-benzoic acid methyl ester and
p-(4,5-epithio-1-ethyl-5-methyl-hept-1-cis/trans-enyl)-benzoic acid methyl ester;
a mixture of p-(5-methyl-1-methylene-hept-4-cis/trans-enyl)-benzoic acid methyl ester and
p-(1,5-dimethyl-hepta-1-cis/trans, 4-cis/trans-dienyl)-benzoic acid methyl ester;
a mixture of p-(5-chloro-5-methyl-1-methylene-heptyl)-N,N-diethyl-benzamide and
p-(5-chloro-1,5-dimethyl-hept-1-cis/trans-enyl)-N,N-diethyl-benzamide;
p-(1,4,5-trimethyl-hexyl)-benzoic acid methyl ester 1-(p-bromophenyl)-2-ethyl-5-methyl-hex-4-en-1-ol; and
a mixture of 1-(p-bromophenyl)-3,7-dimethyl-octa-1,3,6-triene and 1-(p-bromophenyl)-7-methyl-3-methylene-octa-1,6-diene.

Charcteristic representative aldehyde starting materials of Formula III-A are, for example:

2-ethyl-5-methyl-hex-4-en-1-al;
2-pentyl-5-isobutyl-hex-4-en-1-al; and
2-ethyl-5-methyl-hept-4-en-1-al.

Charcteristic representative ketone starting materials of Formula III-A are, for example:

5,6-dimethyl-hept-5-en-2-one;
6-methyl-oct-5-en-2-one; and
7-methyl-non-6-en-3-one.

Charcteristic representative aldehyde starting materials of Formula III-B are, for example:

3,7-dimethyl-oct-6-en-1-al [citronellal];
3,7-dimethyl-octa-2,6-dien-1-al; and
4-ethyl-7-methyl-oct-6-en-1-al.

Characteristic representative aldehyde starting materials of Formula III-C are, for example:

5,9-dimethyl-deca-4,8-dien-1-al;
5,8,9-trimethyl-deca-4,8-dien-1-al; and
6-ethyl-9-methyl-deca-4,8-dien-1-al.

Characteristic representative ketone starting materials of Formula III-C are, for example:

6,10-dimethyl-undeca-5,9-dien-2-one [geranylacetone],
6,10-dimethyl-undeca-2-one,
6-ethyl-10-methyl-dodeca-5,9-dien-2-one;
7-ethyl-10-methyl-undeca-5,9-dien-2-one; and
6,9,10-trimethyl-undeca-5,9-dien-2-one.

Characteristic representative aldehyde starting materials of Formula III-D are, for example:

3,7,11-trimethyl-dodeca-6,10-dien-1-al,
8-ethyl-3,11-dimethyl-dodeca-6,10-dien-1-al;
3,7,11,13-tetramethyl-tetradeca-1-al, and
7-ethyl-3,11-dimethyl-trideca-6,10-dien-1-al, The compounds of Formula II, namely the optionally substituted dihalobenzenes or monohalobenzaldehyde acetals, are also generally known compounds.

DETAILED DESCRIPTION OF THE INVENTION

As used herein, the compound of the Formula I designates all of the compounds having the Formulae I-A, I-B, I-C and I-D.

The term "halogen" as used throughout this application, includes all four halogens, i.e., bromine, chlorine, fluorine and iodine. As used throughout this application, the term "lower alkyl" comprehends both straight and branched chain saturated hydrocarbon groups containing from 1 to 6 carbon atoms, such as methyl, ethyl, propyl, isopropyl, etc. The term "lower alkoxy" comprehends lower alkoxy groups containing from 1 to 6 carbon atoms such as methoxy, propoxy, ethoxy, etc. The term "lower alkenyl" as used herein, includes both straight and branched chain unsaturated hydrocarbon groups having from 2 to 6 carbon atoms such as allyl, methyl-allyl, and the like.

The term "aryl," as used throughout the application, includes mono-nuclear aryl groups such as phenyl which can be unsubstituted or substituted in 1 or more positions with a hydroxy, methylenedioxy, halogen, nitro, lower alkyl or lower alkoxy substituent, and polynuclear aryl groups such as naphthyl, anthryl, phenanthryl, azulyl, etc. which may be substituted with 1 or more of the aforementioned groups. The term "aryloxy carbonyl" comprehends aryloxy-carbonyl groups wherein the aryl moiety is defined as above. The preferred aryloxy carbonyl group is phenoxy-carbonyl. The term "aralkyloxy carbonyl" comprehends aralkoxycarbonyl groups wherein aryl is defined as above and the alkyl is lower alkyl. The preferred aralkoxycarbonyl group is benzyloxycarbonyl.

The term "alkoxycarbonyl" as utilized herein includes lower alkoxycarbonyl groups wherein lower alkoxy is defined as above. Among the preferred lower alkoxycarbonyl groups are included methoxycarbonyl, ethoxycarbonyl and isopropoxycarbonyl. The term "alkenyloxycarbonyl" as defined herein includes the lower alkenyloxycarbonyl groups wherein lower alkenyl is defined as above. Among the preferred alkenyloxycarbonyl groups are included allyloxycarbonyl.

The aryloxymethylene group as used herein includes aryloxymethylene groups wherein aryl is defined as above. Among the preferred aryloxymethylene groups is included phenyloxymethylene. The term "aralkoxymethylene" as used herein includes arloweralkyloxymethylene wherein aryl and lower alkyl are defined as above. The preferred aralkyloxymethylene in accordance with this invention is benzyloxymethylene.

The term "alkoxymethylene" includes lower alkoxymethylene groups wherein lower alkyl is defined as above. Among the preferred lower alkoxymethylene groups are included methoxymethylene, ethoxymethylene or isopropoxymethylene. The term "alkenyloxymethylene" denotes lower alkenyloxymethylene wherein lower alkenyl is defined as above. Among the preferred lower alkenyloxymethylene groups is included allyloxymethylene. The carbamyl group can be mono-substituted or disubstituted by lower alkyl. Among the preferred lower alkyl-substituted carbamyl groups which can be utilized in accordance with this invention are included methylcarbamyl, N,N-dimethylcarbamyl, ethylcarbamyl, N,N-diethylcarbamyl and isopropylcarbamyl.

The term "lower alkylenedioxy" includes lower alkylenedioxy groups containing from 1 to 6 carbon atoms such as methylenedioxy, ethylenedioxy, etc.

The aldehyde in the compound of Formula II can be acetalized with any conventional lower alkanol containing from 1 to 6 carbon atoms such as methanol, ethanol, isopropanol, etc. On the other hand, the formyl group on the compound of Formula II can be acetalized to produce a cyclic acetal by reacting the formyl group with a lower alkylene glycol containing from 2 to 6 carbon atoms. Among the lower alkylene glycols which can be utilized for this purpose are included ethylene glycol, propylene glycol, etc.

The compounds of Formulae I-A, I-B, I-C and I-D are useful in the control of pests such as *Tineola bisel-liella* (clothes moth), *Ephestia kuniella* (flour moth), *Dysdercus cingulatus* (cotton bug), etc.

In contrast to most of the known pest-control agents which kill, disable or repel the pests by acting as contact-poisons and feed-poisons, the compound of Formulae I-A, I-B, I-C and I-D above prevent maturation and proliferation of these pests by interfering with their hormonal system. In insects, for example, the formation into the imago is disturbed. Furthermore, the sequence of generations is interrupted and the insects are indirectly killed.

The compounds of Formulae I-A, I-B, I-C and I-D above are practically non-toxic to vertebrates. The toxicity of these compounds is greater than 1000 mg./kg. body weight. Moreover, these compounds are readily degraded and the risk of accumulation is therefore excluded. Therefore, these compounds can be used without fear of danger in the control of pests in animals; plants; foods; and textiles.

Generally, in controlling invertebrate animals, the compounds of Formula I-A, I-B, I-C and I-D above thereof are applied to the material to be protected, e.g., foodstuffs, feeds, textiles, plants in concentrations of from about $10^{-3}$ to $10^{-5}$ gm./cm.$^2$ of the material to be protected. Generally, it is preferred to utilize the compounds of Formula I above in a composition with a suitable inert carrier. Any conventional inert carrier can be utilized.

The compound of Formula I can, for example, be used in the form of emulsions, suspensions, dusting agents, solutions or aerosols. In special cases, the materials to be protected (e.g., foodstuffs, seeds, textiles and the like) can also be directly impregnated wtih the appropriate compound or with a solution thereof. Moreover, the compounds can also be used in a form which only releases them by the action of external influences (e.g., contact with moisture) or in the animal body itself.

The compound of Formula I above can be used as solutions suitable for spraying on the material to be protected which can be prepared by dissolving or dispersing these compounds in a solvent such as mineral oil fractions; cold tar oils; oils of vegetable or animal origins; hydrocarbons such as naphthalenes; ketones such as methyl ethyl ketone; chlorinated hydrocarbons such as tetrachloroethylene, tetrachlorobenzene, and the like. The compounds of Formula I above can also be prepared in forms suitable for dilution with water to form aqueous liquids such as, for example, emulsion concentrates, pastes or powders. The compounds of Formula I above can be combined wiht solid carriers for making dusting or strewing powders as, for example, talc, kaolin, bentonite, calcium carbonate, calcium phosphate, etc. The compositions containing the compound of Formula I above can contain, if desired, emulsifiers, dispersing agents, wetting agents, or other active substances such as fungicides, bacteria-cides, nematocides, fertilizers and the like. These materials which are to be protected act as bait for the insect. In this manner, the insect, by contacting the material impregnated with the compound of Formula I above, also contacts the compound of Formula I above.

The aldehydes and ketones of Formula III-A, III-B, III-C and III-D can be prepared in a known manner by chain lengthening alcohols poorer in carbon with aldehyde enol ethers by the process given in U.S. Pat. No. 3,453,317, Marbet, July 1, 1969. Thus, by this process 5-methyl-hex-4-en-1-al can be prepared from methylbutenol and a vinyl ether. The ketones of Formulae III-A and III-C can, for example, be prepared by reacting lower carbinols with ketone enol ethers by the process disclosed in U.S. Pat. No. 3,453,317. In this manner, a ketone such as methylheptenone can be prepared from methylbutenol and isopropenyl ethyl ether.

The compound of Formulae I-A, I-B, I-C and I-D can be formed by reacting a Grignard salt of the compound of Formula II with either an aldehyde or ketone of Formulae III-A, III-B, III-C or III-D. In carrying out this reaction any of the conventional conditions utilized in a Grignard reaction can be employed.

The Grignard reaction produces a compound where M in the compound of Formulae I-A, I-B, I-C and I-D is a hydroxy group. This compound can be converted to a compound of the Formula I-A where E and M, or M and G form a carbon to carbon double bond, the compound of Formula I-B wherein M and N form a carbon to carbon double bond, the compound of Formula I-C where M and L, or M and G form a carbon to carbon double bond, or the compound of Formula I-D where M and N form a carbon to carbon double bond by treating the resultant product of the Grignard reaction with a dehydrating agent. Any conventional dehydrating agent such as thionyl chloride or phosphorous pentoxide can be utilized in this reaction. Generally, this dehydration reaction is carried out by conventional means such as in an inert organic solvent at the reflux temperature of the solvent.

In the case where X in the resulting dehydration product is a halogen, this halogen atom can be converted into a carboxyl group. This conversion is effected by forming a Grignard salt of the halide and reacting the Grignard salt with carbon dioxide, via a Grignard reaction utilizing conventional methods. This carboxyl group can, if desired, be esterified to form a lower alkoxy-carbonyl group, a lower alkenyloxy-carbonyl group, an aryloxy-carbonyl group or an aralkoxy-carbonyl group by conventional esterification processes. On the other hand, this carboxyl group can be amidated by reaction with mono-substituted lower alkyl amines or disubstituted lower alkyl amines. In this manner, the carboxyl group is converted into an alkyl substituted carbamyl group. This amidation can be carried out by conventional procedures well known in the art.

On the other hand, the carboxyl group can be reduced by conventional means such as treatment with lithium aluminum hydride to form a hydroxymethylene group. This hydroxymethylene group can be etherified to form a lower alkoxymethylene group, a lower alkenyloxymethylene group, an aryloxymethylene group or an aralkoxymethylene group by conventional etherification procedure well known in the art.

If X', in the Grignard salt of Formula II above, is an acetalized aldehyde group, such as ethylenedioxy, this compound can be reacted with an aldehyde or ketone of Formulae III-A, III-B, III-C or III-D. This reaction produces a compound of Formula I where M is a hydroxy group and X is an acetalized formyl group. The acetalized formyl group can be converted to a formyl group by conventional means such as treatment with p-toluene sulfonic acid. The resulting compound, can, if desired, be dehydrated by the procedure given above to produce a compound of Formula I where M taken together with E, N, L or G form a double bond. The formyl group in this dehydrated product, can, if desired, be reduced to a hydroxymethylene group by conventional procedures such as treatment with lithium aluminum hydride. This hydroxymethylene group can be etherified by the aforementioned procedures. On the other hand, the formyl group can be oxidized by conventional means such as treatment with manganese dioxide to a carboxyl group. The resulting carboxyl group can be esterified or amidated by the procedures given hereinbefore.

The double bonds in the aliphatic side chain of the compound of Formula I where X is an aldehyde, ester, amide or ether group can be hydrogenated, epoxidized, episulphidized or hydrohalogenated by conventional procedures.

Hydrogenation of the double bonds in compounds of Formula I above can be carried out by catalytically hydrogenating the compound of the Formula I by conventional procedures. This hydrogenation reaction is generally carried out in an inert organic solvent, such as, for example, methanol, ethanol, etc. Generally, this reaction can be carried out by treating the compound of Formula I with hydrogen at a temperature of from about 25° C. to the boiling point of the inert organic solvent medium. In carrying out this reaction, any conventional hydrogenation catalyst such as Raney-nickel or noble metals which include platinum or palladium can be utilized. This reaction can be carried out at atmospheric pressure. On the other hand, elevated pressures can be utilized.

In accordance with this invention, one or more of the double bonds in the compound of Formula I above can be converted into epoxy bridges by either treating the compound of Formula I above with a N-halosuccinimide and water or by treating the compound of Formula I with organic peracid. The treatment of the compound of Formula I with a N-halosuccinimide and water selectively and exclusively oxidizes the terminal double bond giving rise to the halohydrins of Formula I. On the other hand, when the compound of Formula I above contains more than one double bond and is epoxidized with an organic peracid, epoxidization of one or more of the double bonds within the compound of Formula I can be carried out depending upon the conditions utilized.

The double bond in the compound of Formula I can be converted into the corresponding halohydrin by treating the compound of Formula I with a N-halosuccinimide, preferably N-bromosuccinimide and water, to selectively and exclusively oxidize the terminal double bond. The formation of these halohydrins is carried out at a temperature of from 0° C. to 30° C. The use of N-halosuccinimide and water to hydroxyhalogenate the compound of Formula I selectively hydroxyhalogenates the terminal double bond without affecting any other double bond. This reaction can be carried out in an inert organic solvent such as dioxane, tetrahydrofuran, or 1,2-dimethoxyethane.

The halohydrin of Formula I above can be converted to the corresponding epoxy compound by treating the halohydrin with a base. The formation of the epoxide from the halohydrin is carried out at a temperature of from 0° C. to 30° C. Any of the conventional bases including alkali metals can be utilized. Among these bases, alkali metal hydroxides and alkali metal alcoholates such as sodium methylate, sodium ethylate, etc. are generally preferred in converting the halohydrin to the corresponding epoxy compound. This reaction is generally carried out in an inert organic solvent in case a metal hydroxide is used as base, with lower alkanols such as methanol or ethanol being preferred in case an alcoholate is used as base.

The compound of Formula I which contains double bonds within the aliphatic side chain can be converted to epoxy compounds by treating the compound of Formula I with an organic peracid. Any conventional organic peracid can be utilized in this reaction. Among the conventional peracids which can be utilized are included, peracetic acid, perbenzoic acid, m-chloroperbenzoic acid, and perphthalic acid. This reaction is generally carried out in an inert organic solvent. Any conventional inert organic solvent can be utilized. Among the inert organic solvents which can be utilized, the halogenated hydrocarbons such as methylene chloride and chloroform are preferred. Generally, this reaction is carried out at a temperature of from 0° C. to 30° C. If one mole of an organic peracid is utilized to epoxidize one mole of the compound of Formula I wherein the aliphatic side chain contains two or more double bonds, the terminal double bond will be epoxidized. If it is desired to epoxidize all of the double bonds in the compound of Formula I above, one mole of the compound of Formula I is epoxidized in the foregoing manner with at least the number of moles of the organic peracid per double bond contained within one mole of the compound of Formula I above.

The compound of Formula I above can be episulphidized by conventional means. If a halohydrin of the compound of Formula I is formed by the aforementioned process, this halohydrin can be episulphidized in a two-step process. In the first step, the halohydrin of Formula I is reacted with an episulphidizing agent to form the corresponding isothiouronium salt. The isothiouronium salt is then cleaved with a base to form the epithio compound of Formula I above.

The conversion of the halohydrin compound of Formula I above to the isothiouronium salt is carried out by utilizing an episulphidizing agent. Any conventional episulphidizing agent can be utilized in carrying out this reaction step. Among the conventional episulphidizing agents are included, thiocyanates such as ammonium thiocyanate; alkali metal thiocyanates such as sodium thiocyanate or potassium thiocyanates; thiourea; N-substituted thiourea such as thiobarbituric acid; thioamides or alkali metal thiosulfates, such as sodium thiosulfate. Of the episulphidizing agents, thiourea and alkali metal thiocyanates are preferred. Generally, in carrying out this reaction at least one mole of the episulphidizing agent is present per mole of the halohydrin of Formula I. The formation of the isothiouronium salt from the halohydrin of Formula I above is generally carried out in the presence of an inert polar organic solvent. Any conventional polar organic solvent can be utilized. Among the conventional organic polar solvents which can be utilized in this conversion are included lower alkanols such as methanol. In carrying out this reaction, temperature and pressure are not critical and this reaction can be carried out at room temperature and atmospheric pressure. However, if desired, temperatures as high as the reflux temperature of the reaction mixture can be utilized.

The isothiouronium salt is cleaved to form the epithio compound Formula I by treating the isothiouronium salt with a base. Any of the conventional bases such as those hereinbefore mentioned can be utilized. Among the conventional bases which can be utilized, alkali metal carbonates, such as sodium carbonate and potassium carbonate are preferred. Generally, these carbonates are added in the form of an aqueous solution. Generally, this cleavage of the isothiouronium salt is carried out in the solvent system which was utilized for its formation. Therefore, organic polar solvents such as methanol and ethanol are preferred. In carrying out this cleavage reaction, temperature and pressure are not critical and this reaction can be carried out at room temperature and atmospheric pressure. However, higher or lower temperatures can be utilized. Any temperature from about 0° C. to the reflux temperature of the reaction mixture can be utilized. However, temperatures of from 0° C. to 5° C. are generally preferred.

The compound of Formula I containing epoxy groups in its aliphatic side chain can be converted to the corresponding epithio compound of Formula I above by episulphidization by any one of two methods. In the first method, the epoxide is converted to the epithio compound in two steps. In the first step, the epoxide of Formula I above is reacted with an episulphidizing agent in the presence of a mineral acid at a temperature of from 0° C. to 30° C. to form the isothiouronium salt. In the second step, the isothiouronium salt is cleaved to form the epithio compound by means of treatment with a base.

In the first step of this reaction, the epoxide of Formula I is reacted with an episulphidizing agent in the presence of a mineral acid at a temperature of from 0° C. to 30° C. Generally, it is preferred to utilize temperatures of from 0° C. to 5° C. in carrying out this reaction. Any conventional mineral acid can be utilized such as sulfuric acid, hydrochloric acid, etc. The preferred acid is an aqueous sulfuric acid such as 2 N aqueous sulfuric acid. Any conventional episulphidizing agent such as the episulphidizing agents mentioned hereinbefore can be utilized. Thiourea is the preferred episulphidizing agent. Generally, in carrying out this reaction, at least one mole of the episulphidizing agent is present per epoxy group contained within one mole of a compound of Formula I. In this manner all of the epoxide groups contained with the compound of Formula I can be converted to epithio groups. In carrying out this reaction, an inert organic solvent can be utilized. Any conventional inert organic solvent can be utilized. Among the inert organic solvents, dioxane is preferred. The isothiouronium salt thus formed can be converted into the compound of Formula I above in the manner hereinbefore described.

On the other hand, the epoxide of Formula I can be converted to the corresponding epithio compound in one step by treating the epoxide with an episulphidizing agent at the reflux temperature of the reaction medium. This one-step reaction can be carried out without the presence of a material acid. Any conventional episulphidizing agent such as the agents mentioned hereinbefore can be utilized in carrying out this one-step reaction. Among the preferred episulphidizing agents, the alkali metal thiocyanates such as sodium or potassium thiocyanate and thiourea are preferred. Generally, in carrying out this reaction at least one mole of the episulphidizing agent is utilized per epoxide group contained within one mole of the compound of Formula I. In this manner, all of the epoxide groups contained within the compound of Formula I can be converted to epithio groups. Furthermore, this reaction is generally carried out in a solvent medium. Any conventional inert organic solvent such as the solvents hereinbefore mentioned can be utilized in carrying out this reaction. Among the preferred solvents are included lower alkanols such as ethanol and methanol.

Where the compound of Formula I contains double bonds in its aliphatic side chain, these double bonds can be halogenated by treatment with a hydrogenhalide such as hydrogen chloride. The halogenation reaction can be carried out in an inert organic solvent medium. Any conventional inert organic solvent medium can be utilized. Among the inert organic solvents, the ether solvents, particularly ethyl or lower alkanols, particularly methanol or ethanol are preferred. The reaction is carried out by saturating the solvent medium with hydrogen halide at a low temperature (e.g., at a temperature of from about $-20°$ C. to $-25°$ C. or at a temperature of from about $0°$ C. to $35°$ C.). If the reaction is carried out at a temperature in the range of from $-20°$ to $-25°$ C. the compound of Formula I above is monohalogenated at the terminal double bond. On the other hand, when temperatures of from $0°$ C. to $35°$ C. are utilized, all of the double bonds present in the aliphatic side chain of the compound of Formula I above are halogenated.

After the reaction of the compound of Formula I with a hydrogen halide, the reaction solution is worked up in a conventional manner to produce the halogenated derivative of Formula I. This work up can be done by careful evaporation of the solvent under reduced pressure and taking up the concentrate in diethyl ether. The ether solution can be deacidified, dried and evaporated under reduced pressure to produce the halogenate product of Formula I above.

The following examples are illustrative but not limitative of this invention. The ether utilized in these examples is diethyl ether. The petroleum ether utilized in these examples has a boiling point of $40°$ C. to $45°$ C.

EXAMPLE 1

77.2 g. of 7-methyl-non-6-cis/trans-en-3-one are introduced into 80 ml. of absolute ether and cautiously added dropwise to a p-bromophenyl magnesium bromide solution prepared from 12.2 g. of magnesium and 118 g. of p-dibromobenzene in 500 ml. of absolute ether. The reaction mixture is heated under reflux conditions for 80 minutes. The Grignard complex formed is subsequently decomposed, with ice-cooling, by dropwise addition of a solution of 30 g. of ammonium chloride in 125 ml. of water. After decanting off the clear ether layer, the magnesium hydroxide which precipitates gelatinously is treated with 1000 ml. of a saturated ammonium chloride solution and extracted with ether. The combined ether phases are washed with a saturated ammonium chloride solution and subsequently with water, dried and evaporated. The residual 3-(p-bromophenyl)-7-methyl-non-6-cis/trans-en-3-ol can be purified by chromatography on Kieselgel [eluant: hexane/ether 85:15 parts by volume]. B.P. about $120°$ C./0.001 mm. Hg; $n_D^{20}=1.5400$.

EXAMPLE 2

78.5 g. of 3-(p-bromophenyl)-7-methyl-non-6-cis/trans-en-3-ol are introduced into 248 ml. of pyridine and treated dropwise within 30 minutes at $0°$ with 33.6 g. of thionyl chloride. The reaction mixture is poured into ice-water, stirred for 30 minutes and extracted with ether. The ether extract is successively washed with ice-cold 1 N hydrochloric acid, a sodium bicarbonate solution and a sodium chloride solution, then dried and evaporated. The residual mixture of about 80% by weight of 3-(p-bromophenyl)-7-methyl-nona-2-cis/trans-6-cis/trans-diene and about 20% by weight of 3-(p-bromophenyl)-7-methyl-nona - 3 - cis/trans, 6-cis/trans-diene can be purified by adsorption on Kieselgel [eluant: hexane]; $n_D^{20}=1.5562$.

EXAMPLE 3

36.8 g. of a mixture consisting of about 80% by weight of 3-(p-bromophenyl)-7-methyl-nona - 2 - cis/trans, 6-cis/trans-diene and about 20% by weight of 3-(p-bromophenyl)-7-methyl-nona - 3 - cis/trans, 6-cis/trans-diene are treated with 120 ml. of water- and peroxide-free tetrahydrofuran and, with gassing with an inert gas, introduced into a suspension of 3.05 g. of magnesium (activated with iodine) in 20 ml. of water- and peroxide-free tetrahydrofuran. The reaction mixture is heated to $60°$ C. for 2.5 hours, then cooled with carbon dioxide/acetone and, with stirring, treated with an excess (about 200 g.) of solid pulverized carbon dioxide. The cooling bath is subsequently removed, the excess carbonic acid evaporated off and the tetrahydrofuran removed under reduced pressure. The mixture is thereupon treated, with ice-cooling, with 250 ml. of ice-cold 2 N sulfuric acid and extracted with ether. The ether extract is extracted twice with 250 ml. of 1 N caustic soda each time. The aqueous alkali phase is separated off, washed with ether, acidified with ice-cold 2 N sulfuric acid and extracted with ether. The ether extract is washed neutral, dried and evaporated. The residual mixture of about 80% by weight of p-[1-(cis/trans-ethylidene)-5-methyl-hept-4-cis/trans-enyl]-benzoic acid and about 20% by weight of p-(1-ethyl-5-methyl-hepta-1-cis/trans, 4-cis/trans-dienyl)-benzoic acid can be further processed as follows without further purification.

29.2 g. of a mixture of about 80% by weight of p-[1-(cis/trans-ethylidene)-5-methyl-hept - 4 - cis/trans-enyl]-benzoic acid and about 20% by weight of p-(1-ethyl-5-methyl-hepta-1-cis/trans, 4-cis/trans-dienyl)-benzoic acid are introduced into 1000 ml. of absolute benzene and, after addition of 20.2 g. of N,N-dimethylformamide dimethyl acetal, heated under reflux conditions in an inert gas atmosphere for 1 hour. The reaction mixture is subsequently cooled and successively washed with ice-cold 2 N hydrochloric acid, a saturated sodium chloride solution, a saturated sodium bicarbonate solution and once more with a saturated sodium chloride solution, dried and evaporated. The residual mixture of about 80% by weight of p-[1-(cis/trans - ethylidene)-5-methyl-hept-4-cis/trans-enyl]-benzoic acid methyl ester and about 20% by weight of p-[1-ethyl-5-methyl-hepta - 1 - cis/trans, 4-cis/trans-dienyl]-benzoic acid methyl ester can be purified by chromatography on Kieselgel [eluant: hexane/ether 85:15 parts by volume]. B.P. about 125–130° C./0.001 mm. Hg; $n_D^{20}=1.5425$.

EXAMPLE 4

5 g. of a mixture of about 80% by weight of p-[1-(cis/trans - ethylidene)-5-methyl-hept-4-cis/trans-enyl]-benzoic acid methyl ester and about 20% by weight of p-[-1-ethyl-5-methyl-hepta - 1 - cis/trans, 4-cis/trans-dienyl]-benzoic acid methyl ester in 10 ml. of methanol are added dropwise with stirring at −20 to −30° C. within 20 minutes to 140 ml. of absolute methanol saturated with hydrochloric acid gas. The reaction mixture is poured onto 300 ml. of ice and, after addition of 100 ml. of an ice-cold saturated sodium chloride solution, extracted with petroleum ether. The petroleum ether extract is successively washed with a saturated sodium chloride solution, a saturated sodium bicarbonate solution and once more with a saturated sodium chloride solution, dried and evaporated. The residual mixture of about 80% of p-[5-chloro-1-(cis/trans-ethylidene) - 5 - methyl-heptyl]-benzoic acid methyl ester and about 20% of p-[5-chloro-1-ethyl-5-methyl-hept-1-cis/trans-enyl]-benzoic acid methyl ester can be purified by chromatography on Kieselgel [eluant: hexane/acetic acid ethyl ester 95:5 parts by volume]; $n_D^{20}=1.5369$.

EXAMPLE 5

3.4 g. of a mixture of about 80% of p-[1-(cis/trans-ethylidene) - 5 - methyl-hept - 4 - cis/trans-enyl]-benzoic acid methyl ester and about 20% of p-[1-ethyl-5-methyl-hepta-1-cis/trans, 4-cis/trans-dienyl]-benzoic acid methyl ester are dissolved in 70 ml. of methanol. Dry hydrogen chloride is led into the solution with stirring at 0–5° C. for 3.5 hours. The reaction mixture remains standing at room temperature for a further 18 hours. The solvent is evaporated off under reduced pressure at 35° C. The concentrate is poured into ice-water and exhaustively extracted with ether. The ether extract is successively washed with a saturated sodium bicarbonate and a saturated sodium chloride solution, dried and evaporated. The residual p-(1,5-dichloro - 1 - ethyl-5-methyl-heptyl)-benzoic acid methyl ester can be purified by chromatography on Kieselgel [eluant: hexane/ether 70:30 parts by volume]; $n_D^{20}=1.5268$.

EXAMPLE 6

3 g. of a mixture of about 80% by weight of p-[1-(cis/transethylidene)-5-methyl-hept - 4 - cis/trans-enyl]-benzoic acid methyl ester and about 20% by weight of p-[1-ethyl - 5 - methyl - hepta - 1 - cis/trans, 4-cis/trans-dienyl]-benzoic acid methyl ester are introduced into 60 ml. of methylene chloride and treated, with stirring, within 1 hour at 0° with 6.04 g. of m-chloroperbenzoic acid (79%). The mixture is stirred at 24° C. for a further 30 minutes, diluted with 100 ml. of methylene chloride and successively washed with ice-cold 1 N caustic soda and a saturated sodium chloride solution, dried and evaporated. The residual mixture of about 20% by weight of p-(1,2; 4,5-diepoxy-1-ethyl-5-methyl-heptyl)-benzoic acid methyl ester and about 80% by weight of p-[1,2-epoxy-1-(3,4-epoxy-4-methyl-hexyl)propyl]-benzoic acid methyl ester can be purified by chromatography on Kieselgel [eluant: hexane/ether 60:40 parts by volume]. B.P. about 165–170° C./0.001 mm. Hg; $n_D^{20}=1.5173$.

EXAMPLE 7

10 g. of a mixture of about 80% of p-[1-(cis/trans-ethylidene)-5-methyl-hept-4-cis/trans-enyl]-benzoic acid methyl ester and about 20% of p-[1-ethyl-5-methyl-hepta-1-cis/trans, 4-cis/trans-dienyl]-benzoic acid methyl ester are introduced into 200 ml. of methylene chloride and treated within 30 minutes at 1–3° C. with 8.4 g. of m-chloroperbenzoic acid (79%). The mixture is stirred at 1–3° C. for a further 10 minutes, diluted with 200 ml. of methylene chloride and successively washed with ice-cold 1 N caustic soda and a saturated sodium chloride solution, dried and evaporated. The residual mixture of about 80% by weight of p-[4,5-epoxy-1-cis/trans-ethylidene-5-methyl-heptyl]-benzoic acid methyl ester and 20% by weight of p-[4,5-epoxy-1-ethyl-5-methyl-hept-1-cis/trans-enyl]-benzoic acid methyl ester can be purified by chromatography on Kieselgel [eluant: hexane/acetic acid ethyl ester 80:20]. B.P. about 162–165° C./0.001 mm. Hg; $n_D^{20}=1.5352$.

EXAMPLE 8

2.9 g. of a mixture of about 80% by weight of p-[4,5-epoxy-1-cis/trans-ethylidene - 5 - methyl-heptyl]-benzoic acid methyl ester and about 20% by weight of p-[4,5-epoxy-1-ethyl-5-methyl-hept - 1 - cis/trans - enyl]-benzoic acid methyl ester are added dropwise within 15 minutes at 1–3° C. to a mixture of 5 ml. of 2 N sulphuric acid and 0.77 g. of pulverized thiourea. The reaction mixture is stirred at room temperature for 3 hours, then cautiously treated dropwise with a solution of 0.57 g. of sodium carbonate in 3.2 ml. of water and, after addition of 50 ml. of ice-water, exhaustively extracted with ether. The ether extract is once more washed with a saturated sodium chloride solution, dried and evaporated. The residual mixture of about 80% by weight of p-[4,5-epithio-1-cis/trans-ethylidene - 5 - methyl-heptyl]-benzoic acid methyl ester and about 20% by weight of p-[4,5-epithio-1-ethyl-5-methyl-hept - 1 - cis/trans-enyl]-benzoic acid methyl ester can be purified by chromatography on Kieselgel [eluant: ether]. B.P. about 166–168° C./0.001 mm. Hg; $n_D^{20}=1.5616$.

EXAMPLE 9

144.55 g. of p-bromobenzaldehyde ethylene acetal are introduced into 530 ml. of water-and peroxide-free tetrahydrofuran and added dropwise in an inert gas atmosphere to a suspension of 12.1 g. of magnesium (corroded with iodine) in 40 ml. of water- and peroxide-free tetrahydrofuran in such a manner that the temperature remains between 25 and 35° C. The mixture is subsequently stirred at room temperature for 1 hour and treated dropwise with a solution of 6-methyl-oct-5-cis/trans-en-2-one in 70 ml. of water- and peroxide-free tetrahydrofuran, in doing which the temperature should not exceed 40° C. After 1 hour stirring at 40° C., the reaction mixture is treated dropwise with ice-cooling, with 30 g. of ammonium chloride in 75 ml. of water. After decanting off the clear solution, the magnesium hydroxide which precipitates is washed out with tetrahydrofuran. The combined tetrahydrofuran phases are evaporated. The residue is taken up in 1000 ml. of ether. The ether solution is washed with a saturated sodium chloride solution, dried and evaporated. The residual p-1-hydroxy-1,5-dimethyl-hept-4-enyl)-benzaldehyde ethylene acetal can be purified by chromatography on Kieselgel [eluant: hexane/acetic acid ethyl ester 70:30 parts by volume].

65 g. of p-(1-hydroxy-1,5-dimethyl-hept-4-enyl)-benzaldehyde ethylene acetal are introduced into 1100 ml. of acetone and treated with a solution of 22 g. of p-toluenesulphonic acid in 660 ml. of acetone/water 1:1. The mixture remains standing at room temperature for 2 hours. The acetone is subsequently evaporated off under reduced pressure. The concentrate is poured onto ice and extracted with ether. The ether extract is washed neutral with a saturated sodium chloride solution, dried and evaporated. The residual p-(1-hydroxy-1,5-dimethyl-hept-4-cis/trans-enyl)-benzaldehyde boils at about 135–140° C./0.001 mm. Hg; $n_D^{20}=1.5439$.

EXAMPLE 10

32 g. of p-(1-hydroxy-1,5-dimethyl-hept-4-cis/trans-enyl)-benzaldehyde are introduced into 107 ml. of collidine and 325 ml. of dimethylformamide and, with ice-cooling, treated dropwise in an inert gas atmosphere within 15 minutes with 33 ml. of methane-sulphonic acid chloride freshly distilled at normal pressure. The mixture is stirred at room temperature for 1 hour, then poured onto ice, treated with 2000 ml. of 1 N hydrochloric acid and exhaustively extracted with ether. The ether extract is washed neutral with 1 N caustic soda and a saturated sodium chloride solution, dried and evaporated. The residual mixture of p-(5-methyl-1-methylidene-hept-4-cis/trans-enyl)-benzaldehyde and p-(1,5-dimethyl-hepta-1-cis/trans, 4-cis/trans-dienyl)-benzaldehyde can be purified by chromatography on Kieselgel [eluant: hexane/acetic acid ethyl ester 80:20 parts by volume]. B.P. about 120–122° C./0.005 mm. Hg; $n_D^{20}=1.5585$.

EXAMPLE 11

2.5 g. of p-(1-hydroxy-1,5-dimethyl-hept-4-cis/trans-enyl)-benzaldehyde, 2.45 g. of sodium cyanide and 18.25 g. of manganese dioxide are introduced into 100 ml. of absolute methanol and treated dropwise with stirring at room temperature with 0.9 g. of acetic acid. The mixture is stirred at room temperature for 62 hours. The excess manganese dioxide is separated off and washed with methanol. The combined methanol phases are evaporated. The residue is treated with water and extracted with ether. The ether extract is washed with a saturated sodium chloride solution, dried and evaporated. The residual p-(1 - hydroxy - 1,5 - dimethyl-hept-4-cis/trans-enyl)-benzoic acid methyl ester can be purified by chromatography on Kieselgel [eluant: hexane/acetic acid ethyl ester 80:20 parts by volume]. B.P. about 138° C./ 0.001 mm. Hg; $n_D^{20}=1.5288$.

EXAMPLE 12

2.2 g. of p-(1 - hydroxy - 1,5-dimethyl-hept-4-cis/trans-enyl)-benzoic acid methyl ester are dissolved in 80 ml. of methanol and, with stirring, gassed with dry hydrogen chloride at 0–5° C. for 4 hours. The mixture remains standing at room temperature for 20 hours. The methanol is evaporated off under reduced pressure. The concentrate is poured into ice-water and extracted with ether. The ether extract is successively washed with a saturated sodium bicarbonate and sodium chloride solution, dried and evaporated. The residual p-(1,5-dichloro-1,5-dimethyl-heptyl)-benzoic acid methyl ester can be purified by chromatography on Kieselgel [eluant: hexane/ether 70:30 parts by volume]; light-yellow oil; $n_D^{20}=1.5287$.

EXAMPLE 13

22.8 g. of a mixture of p-(5 - methyl - 1 - methylidene-hept - 4 - cis/trans-enyl)-benzaldehyde and p-(1,5 - dimethyl-hepta - 1 - cis/trans, 4-cis/trans-dienyl)-benzaldehyde, 24.5 g. of sodium cyanide and 182.5 g. of manganese dioxide are introduced into 1000 ml. of ethanol and treated dropwise with stirring at room temperature with 9 g. of acetic acid. The mixture is stirred at room temperature for 18 hours. The excess manganese dioxide is separated off and washed with ethanol. The combined ethanol phases are evaporated. The residue is treated with water and extracted with ether. The ether extract is washed with a saturated sodium chloride solution, dried and evaporated. The residual mixture of about 65% of p-(5 - methyl - 1 - methylene-hept - 4 - cis/trans-enyl)-benzoic acid ethyl ester and about 35% of p-(1,5-dimethyl-hepta - 1 - cis/trans, 4 - cis/trans-dienyl)-benzoic acid ethyl ester can be purified by chromatography on Kieselgel [eluant: hexane/acetic acid ethyl ester 80:20 parts by volume]. B.P. about 125–130° C./0.01 mm. Hg; $n_D^{20}=1.5340$.

EXAMPLE 14

11.1 g. of a mixture of about 65% by weight of p-(5 - methyl - 1 - methylene-hept - 4 - cis/trans-enyl)-benzoic acid ethyl ester and about 35% by weight of p-(1,5 - dimethyl-hepta - 1 - cis/trans, 4 - cis/trans-dienyl)-benzoic acid ethyl ester are treated with 150 ml. of 10% methanolic potassium hydroxide. The mixture is stirred at room temperature for 64 hours. The methanol is distilled off under reduced pressure. The concentrate is poured into ice-water and extracted with ether. The aqueous alkaline phase is isolated, acidified with 1 N hydrochloric acid and extracted with ether. The ether extract is washed neutral with a saturated sodium chloride solution, dried and evaporated. The mixture obtained (10.6 g.) of p-(5 - methyl - 1 - methylene-hept-4-cis/trans-enyl)-benzoic acid and p-(1,5 - dimethyl-hepta-1-cis/trans, 4 - cis/trans-dienyl)-benzoic acid, a light-yellow oil, is introduced into 60 ml. of absolute ether and, after addition of 3.7 ml. of pyridine, treated dropwise within 5 minutes at 0° with 3.4 ml. of thionyl chloride. The mixture is stirred at room temperature for 50 minutes. The pyridine hydrochloride is separated off and rinsed with absolute ether. The wash-ether is combined with the reaction solution. The mixture is cooled to 0°, stirred at room temperature for 25 minutes (after addition of 9.3 ml. of diethylamine in 25 ml. of absolute ether), poured onto ice and extracted with ether.

The ether extract is successively washed with a saturated sodium bicarbonate and sodium chloride solution, dried and evaporated. The residual mixture of about 65% by weight of p-(5-methyl-1-methylene-hept-4-cis/trans-enyl)-N,N-diethyl benzamide and about 35% by weight of p - (1,5 - dimethyl-hepta - 1 - cis/trans, 4-cis/trans-dienyl)-N,N-diethyl-benzamide can be purified by chromatography on Kieselgel [eluant: hexane/acetone 70:30 parts by volume]. B.P. about 140° C./0.001 mm. Hg, $n_D^{20}=1.5394$.

EXAMPLE 15

2.6 g. of a mixture of about 65% by weight of p-(5 - methyl - 1 - methylene-hept - 4 - cis/trans-enyl)-N,N-diethyl-benzamide and about 35% by weight of p-(1,5-dimethyl-hepta - 1 - cis/trans, 4 - cis/trans-dienyl)-N,N-diethyl-benzamide are dissolved in 10 ml. of absolute methanol and added dropwise within 10 minutes at −10 to −22° C. to 70 ml. of methanol saturated with hydrogen chloride. The reaction mixture is stirred at −20 to −18° C. for 20 minutes, then poured onto ice, treated with 50 ml. of a saturated sodium chloride solution and extracted with petroleum ether. The petroleum ether extract is successively washed with a saturated sodium bicarbonate and sodium chloride solution, dried and evaporated. The residual mixture of about 65% by weight of p-(5 - chloro - 5 - methyl - 1 - methylene-heptyl)-N,N-diethyl-benzamide and about 35% by weight of p - (5 - chloro - 1,5 - dimethyl-hept - 1 - cis/trans-enyl)-N,N-diethyl-benzamide can be purified by chromatography on Kieselgel [eluant: hexane/acetone 80:20 parts by volume]; light-yellow oil; $n_D^{20}=1.5378$.

EXAMPLE 16

3 g. of a mixture of about 65% by weight of p-(5-methyl-1-methylene-hept - 4 - cis/trans-enyl) - N,N - diethyl-benzamide and about 35% by weight of p-(1,5-dimethyl-hepta - 1 - cis/trans, 4 - cis/transdienyl) - N,N - diethyl-benzamide are introduced into 60 ml. of absolute methanol and gassed with dry hydrogen chloride at 0–5° C. for 1.5 hours. The mixture remains standing at room temperature for 18 hours. The methanol is distilled off under reduced pressure. The concentrate is poured into ice-water and extracted with ether. The ether extract is successively washed neutral with a saturated sodium bicarbonate and sodium chloride solution, dried and evaporated. The residual p-(1,5-dichloro-1,5-dimethylheptyl) - N,N - diethyl-benzamide can be purified by chromatography on Kieselgel [eluant: hexane/acetone 80:20 parts of volume]; $n_D=1.5306$.

EXAMPLE 17

12.7 g. of a mixture of p-(5-methyl-1-methylidene-hept-4-cis/trans-enyl) - benzaldehyde and p - (1,5 - dimethyl-hepta-1-cis/trans, 4-cis/trans-dienyl) - benzaldehyde, 13.7 g. of sodium cyanide and 102 g. of manganese dioxide are introduced into 560 ml. of absolute methanol and treated dropwise with stirring at room temperature with 5 g. of acetic acid. The mixture is stirred at room temperature for 48 hours. The excess manganese dioxide is separated off and washed with methanol. The combined methanol phases are evaporated. The residue is treated with water and extracted with ether. The ether extract is washed neutral with a saturated sodium chloride solution, dried and evaporated. The residual mixture of about 65% by weight of p-(5-methyl-1-methylene-hept-4-cis/trans-enyl)-benzoic acid methyl ester and about 35% by weight of p-(1,5-dimethylhepta-1-cis/trans, 4-cis/trans-dienyl)-benzoic acid methyl ester can be purified by chromatography on Kieselgel [eluant: hexane/ether 75:25 parts by volume]. B.P. about 106–110° C./0.001 mm. Hg; $n_D^{20}=1.5419$.

EXAMPLE 18

7.2 g. of a mixture of about 65% by weight of p-(5-methyl-1-methylene-hept-4-cis/trans-enyl) - benzoic acid methyl ester and about 35% parts by weight of p-(1,5-dimethyl-hepta-1-cis/trans, 4-cis/trans-dienyl)-benzoic acid methyl ester are dissolved in 150 ml. of methylene chloride and treated within 30 minutes at 1–4° C. with 15.3 g. of 79% m-chloroperbenzoic acid. The mixture is stirred at an internal temperature of 1–2° C. for 15 minutes, then at room temperature for 1 hour, then taken up in 150 ml. of methylene chloride. The methylene chloride solution is washed with 1 N caustic soda and sodium chloride solution, dried over sodium sulfate and evaporated. The residual mixture of about 65% by weight of p-[1,2-epoxy-1-(3,4-epoxy-4-methylhexyl) - ethyl] - benzoic acid methyl ester and about 30% by weight of p-[1,2;4,5-diepoxy-1,5-dimethyl-heptyl]-benzoic acid methyl ester can be purified by chromatography on Kieselgel [eluant: hexane/acetone 90:10 parts by volume]; $n_D^{20}=1.5208$.

EXAMPLE 19

35 g. of 5,6-dimethyl-hept-5-en-2-one are introduced at room temperature with stirring into a p-bromophenyl magnesium bromide solution prepared from 6.1 g. of magnesium and 59 g. of p-dibromobenzene in 100 ml. of absolute ether. The reaction mixture is heated under reflux conditions for a further 1 hour. The Grignard complex formed is subsequently decomposed, with ice-cooling, by addition of a solution of 15 g. of ammonium chloride in 60 ml. of water. The mixture is exhaustively extracted with ether. The extract is washed with water, dried and evaporated. The residual 2-(p-bromophenyl)-5,6-dimethyl-hept-5-en-2-ol can be purified by chromatography on Kieselgel [eluant: benzene/ether 90:10 parts by volume].

EXAMPLE 20

44.6 g. of 2-(p-bromophenyl)-5,6-dimethyl-hept-5-en-2-ol are introduced into 120 ml. of pyridine and treated dropwise within 1 hour at 0–5° C. with 14 ml. of freshly distilled phosphorus oxychloride. The reaction mixture is stirred at room temperature for 12 hours, then poured into ice-water and extracted with ether. The ether extract is successively washed with 1 N hydrochloric acid and water, dried and evaporated. The residual mixture of 2-(p-bromophenyl)-5,6-dimethyl-hepta - 1,5 - diene and 2-(p-bromophenyl) - 5,6 - dimethyl-hepta - 2 - cis/trans, 5-diene can be purified by chromatography on Kieselgel [eluant: hexane].

EXAMPLE 21

19.6 g. of a mixture of 2-(p-bromophenyl)-5,6-dimethylhepta-1,5-diene and 2-(p-bromophenyl) - 5,6 - dimethyl-hepta-2-cis/trans, 5-diene are treated with 20 ml. of water- and peroxide-free tetrahydrofuran and, with stirring and gassing with an inert gas, added dropwise to a suspension of 1.8 g. of magnesium (activated with iodine) in 50 ml. of water- and peroxide-free tetrahydrofuran. The reaction mixture is heated under reflux conditions for 2 hours, then cooled with carbon dioxide/acetone and, with stirring, treated with an excess [about 150 g.] of solid carbon dioxide. The mixture is stirred for 2 hours, subsequently treated, with ice-cooling, with 60 ml. of 1 N sulfuric acid and extracted with ether. The ether extract is washed neutral, dried and evaporated. The residual mixture of p-(4,5-dimethyl-1-methylene-hex - 4 - enyl) - benzoic acid with p-(1,4,5-trimethyl-hexa-1-cis/trans, 4-dienyl)-benzoic acid can be further processed as follows without further purification.

12.2 g. of a mixture of p-(4,5-dimethyl-1-methylene-hex-4-enyl) - benzoic acid and p-(1,4,5-trimethyl-hexa-1-cis/trans, 4-dienyl)-benzoic acid are introduced into 250 ml. of ethyl methyl ketone and, after addition of 5 g. of potassium carbonate and 7.2 g. of methyl iodide, heated under reflux conditions for 5 hours. The solvent is subsequently evaporated off under reduced pressure. The concentrate is shaken with 200 ml. of water, 300 ml. of ether and 5 ml. of 3 N caustic soda. The ether phase is separated off, washed with water, dried and evaporated. The residual mixture of p-(1,4,5-trimethyl-hexa-1-cis/trans, 4-dienyl)-benzoic acid methyl ester and p-(4,5-dimethyl-1-methylene-hex-4-enyl) - benzoic acid methyl ester can be purified by chromatography on Kieselgel.

EXAMPLE 22

5.2 g. of a mixture of p-(1,4,5-trimethyl-hexa-1-cis/trans, 4-dienyl)-benzoic acid methyl ester and p-(4,5-dimethyl-1-methylene-hex-4-enyl)-benzoic acid methyl ester are introduced into 100 ml. of methylene chloride and, with stirring, treated portionwise at 0–5° C. with 3.5 g. of m-chloroperbenzoic acid. The reaction mixture is stirred at room temperature for 1 hour, then diluted with 100 ml. of methylene chloride and successively washed with 20 ml. of a saturated sodium bicarbonate solution and water. The methylene chloride phase is separated off, dried and evaporated. The residual oily mixture of p-(4,5-epoxy - 1,4,5-trimethyl-hex-1-cis/trans-enyl)-benzoic acid methyl ester and p-(4,5-epoxy-4,5-dimethyl-1-methylene-hexyl)-benzoic acid methyl ester can be purified by chromatography on Kieselgel [eluant: benzene/ether 90:10 parts by volume].

EXAMPLE 23

3.5 g. of a mixture of p-(1,4,5-trimethyl-hexa-1-cis/trans, 4-dienyl)-benzoic acid methyl ester and p-(4,5-dimethyl-1-methylene-hex-4-enyl)-benzoic acid methyl ester are dissolved in 30 ml. of ethyl acetate and hydrogenated under normal conditions in the presence of 0.1 g. of platinum oxide. The catalyst is subsequenlty filtered off and the filtrate evaporated. The residual p-(1,4,5-trimethyl-hexyl)-benzoic acid methyl ester can be purified by chromatography on Kieselgel [eluant: ether/petroleum ether 1:5 parts by volume].

EXAMPLE 24

28 g. of 2-ethyl-5-methyl-hex-4-en-1-al are introduced into 50 ml. of absolute ether and cautiously added dropwise with stirring to a p-bromophenyl magnesium bromide solution prepared from 5 g. of magnesium and 47.3 g. of p-dibromobenzene in 100 ml. of ether. The reaction mixture is heated under reflux conditions for 2 hours. The Grignard complex formed is subsequently decomposed, with ice-cooling, by dropwise addition of a solution of 15 g. of ammonium chloride in 100 ml. of water and exhaustively extracted with ether. The ether extract is successively washed with 1 N sulfuric acid and water, dried and evaporated. The residual 1-(p-bromophenyl)-2-ethyl-5-methyl-hex-4-en-1-ol can be purified by chromatography on Kieselgel [eluant: benzene].

EXAMPLE 25

41.6 g. of 6,10-dimethyl-dodeca-5-cis/trans, 9-cis/trans-dien-2-one are introduced into 50 ml. of absolute ether and cautiously added dropwise to a p-bromophenyl magnesium bromide solution prepared from 4.9 g. of magnesium and 47.2 g. of p-dibromobenzene in 200 ml. of absolute ether. The reaction mixture is stirred at room temperature for 1 hour and subsequently treated dropwise, with ice-cooling, with a solution of 12 g. of ammonium chloride in 50 ml. of water. After decanting off the ether layer, the magnesium hydroxide which precipitates is treated with 500 ml. of a saturated ammonium chloride solution and extracted with ether. The combined ether phases are washed with a saturated ammonium chloride solution and subsequently with water, dried and evaporated. The residual 2-(p-bromophenyl)-6,10-dimethyl-dodeca-5-cis/trans, 9-cis/trans-dien-2-ol can be purified by chromatography on Kieselgel [eluant: hexane/ether 90:10 parts by volume]. B.P. about 130–140° C./0.005 mm. Hg; $n_D^{20} = 1.5383$.

EXAMPLE 26

44.3 g. of 2-(p-bromophenyl)-6,10-dimethyl-dodeca-5-cis/trans, 9-cis/trans-dien-2-ol are dissolved in 98.5 ml. of absolute pyridine and, with ice-cooling, treated at 0° within 15 minutes with 18.7 g. of freshly distilled phosphorus oxychloride. The reaction mixture is stirred at room temperature for 24 hours, then, after addition of about 300 g. of ice, stirred for 30 minutes and exhaustively extracted with ether. The ether extract is washed with 2 N hydrochloric acid and a saturated sodium chloride solution, dried and evaporated. The residual mixture of about 65% of 2-(p-bromophenyl)-6,10-dimethyl-dodeca-1,5-cis/trans, 9-cis/trans-triene and about 35% of 2 - (p-bromophenyl)-6,10-dimethyl-dodeca-2-cis/trans, 5-cis/trans, 9-cis/trans-triene can be purified by chromatography on Kieselgel [eluant: hexane/ether 95:5 parts by volume]. B.P. about 130° C.; $n_D^{20} = 1.5518$.

EXAMPLE 27

18.2 g. of a mixture of about 65% by weight of 2-(p-bromophenyl) - 6,10-dimethyl-dodeca-1,5-cis/trans, 9-cis/trans-triene and about 35% by weight of 2-(p-bromophenyl)-6,10-dimethyl-dodeca-2-cis/trans, 5-cis/trans, 9-cis/trans-triene are treated with 60 ml. of water- and peroxide-free tetrahydrofuran and, while gassing with an inert gas, introduced into a suspension of 1.27 g. of magnesium (activated with iodine) in 10 ml. of water- and peroxide-free tetrahydrofuran. The reaction mixture is heated to 60° C. for 2 hours, then cooled with carbon dioxide/acetone and, with stirring, treated with an excess [about 150 g.] of solid pulverized carbon dioxide. The cooling bath is subsequently removed, the excess carbon dioxide evaporated off and the tetrahydrofuran removed under reduced pressure. The mixture is thereupon treated, with ice-cooling, with 60 ml. of 1 N sulfuric acid and extracted with ether. The ether extract is extracted twice with 120 ml. of 0.5 N caustic soda each time. With ice-cooling, the aqueous alkali phase is acidified with 1 N sulfuric acid and extracted with ether. The ether extract is washed neutral, dried and evaporated. The residual mixture of about 65% by weight of p-(5,9-dimethyl-1-methylene-undeca-4-cis/trans, 8-cis/trans-dienyl)-benzoic acid and about 35% by weight of p-(1,5,9-trimethyl-undeca-1-cis/trans, 4-cis/trans, 8-cis/trans-trienyl)-benzoic acid is further processed as follows without further purification.

12 g. of a mixture of about 65% by weight of p-(5,9-dimethyl-1-methylene-undeca - 4 - cis/trans, 8 - cis/trans-dienyl)-benzoic acid and about 35% by weight of p-(1,5,9-trimethyl-undeca-1-cis/trans, 4 - cis/trans, 8 - cis/trans-trienyl)-benzoic acid are introduced into 400 ml. of absolute benzene and, after addition of 6.65 g. of N,N-dimethylformamide dimethyl acetal, heated under reflux conditions in an inert gas atmosphere for 1 hour. The reaction mixture is subsequently cooled, diluted with 600 ml. of ether and successively washed with ice-cold 2 N hydrochloric acid, a saturated sodium chloride solution, a saturated sodium bicarbonate solution and once more with a saturated sodium chloride solution, dried and evaporated. The residual mixture of about 65% by weight of p-(5,9-dimethyl-1-methylene-undeca-4-cis/trans, 8-cis/transdienyl)-benzoic acid methyl ester and about 35% by weight of p-(1,5,9-trimethyl-undeca-1-cis/trans, 4-cis/trans, 8-cis/trans-trienyl)-benzoic acid methyl ester can be purified by chromatography on Kieselgel [eluant: hexane/ether 85:15 by volume]. B.P. 130–135° C./0.001 mm. Hg; $n_D^{20} = 1.5386$.

EXAMPLE 28

3 g. of a mixture of about 65% by weight of p-(5,9-dimethyl-1-methylene-undeca-4 - cis/trans, 8 - cis/trans-dienyl)-benzoic acid methyl ester and about 35% by weight of p-(1,5,9-trimethyl-undeca - 1 - cis/trans, 4-cis/trans, 8-cis/trans-trienyl)-benzoic acid methyl ester are dissolved in 90 ml. of methanol. Dry hydrogen chloride is led into the solution with stirring at 1–3° C. for 3 hours. The reaction mixture is subsequently poured onto 200 ml. of ice and exhaustively extracted with petroleum ether. The petroleum ether extract is successively washed with a saturated sodium chloride solution, a saturated sodium bicarbonate solution and once more with a saturated sodium chloride solution, dried and evaporated. The residual p-(1,5,9-trichloro-1,5,9-trimethyl-undecyl)-benzoic acid methyl ester can be purified by chromatography on Kieselgel [eluant: hexane/acetic acid ethyl ester 92.5:7.5 parts by volume]; $n_D^{20} = 1.5254$.

EXAMPLE 29

3 g. of a mixture of about 65% by weight of p-(5,9-dimethyl-1-methylene-undeca-4 - cis/trans, 8 - cis/trans-dienyl)-benzoic acid methyl ester and about 35% by weight of p-(1,5,9-trimethyl-undeca-1-cis/trans, 4 - cis/trans, 8-cis/trans-trienyl)-benzoic acid methyl ester are introduced into 60 ml. of methylene chloride and, with stirring, treated within 1 hour at 1–4° C. with 4.2 g. of m-chloroperbenzoic acid (79%). The mixture is stirred at 1–3° C. for a further 30 minutes, diluted with 150 ml. of methylene chloride and successively washed with ice-cold 1 N caustic soda and saturated sodium chloride solution, dried and evaporated. The residual mixture of about 65% by weight of p-(4,5;8,9-diepoxy-5,9-dimethyl-1-methylene-undecyl)-benzoic acid methyl ester and about 35% by weight of p-(4,5;8,9-diepoxy-1,5,9-trimethyl-undec-1-enyl)-benzoic acid methyl ester can be purified by chromatography on Kieselgel [eluant: hexane/acetone 90:10 parts by volume]. B.P. 180–186° C./0.001 mm. Hg; $n_D^{20} = 1.5270$.

EXAMPLE 30

30.4 g. of 3,7-dimethyl-octa-2,6-dien-1-al[citral] are dissolved in 30 ml. of tetrahydrofuran and cautiously added dropwise within 30 minutes to a p-bromophenyl magnesium bromide solution prepared from 4.8 g. of magnesium and 47.2 g. of p-dibromobenzene in 80 ml. of absolute tetrahydrofuran. The reaction mixture is heated under reflux conditions for 1 hour. The Grignard complex formed is subsequently decomposed, with ice-cooling, by dropwise addition of an aqueous ammonium chloride solution. The reaction mixture is exhaustively extracted with hexane. The hexane extract is washed neutral, dried and evaporated. The residue [21.1 g.] is dissolved in 60 ml. of sym. collidine and treated at 0° within 20 minutes with 18 ml. of methanesulfonic acid chloride [content of sulfur dioxide about 3.5% by weight]. The reaction mixture remains standing at 0° for 1 hour. It is subsequently poured onto ice and exhaustively extracted with hexane. The hexane extract is successively washed with dilute sulfuric acid, with a saturated sodium bicarbonate solution and with water, dried and evaporated. The residual mixture of 1-(p-bromophenyl)-3,7-dimethyl-octa-1,3,6-triene and 1 - (p - bromophenyl) - 7 - methyl-3-methylene-octa-1,6-diene can be purified by chromatography on Kieselgel [eluant: hexane/acetic acid ethyl ester 85:15 parts by weight]. B.P. about 105–106° C./0.03 mm. Hg; $n_D^{20} = 1.5909$.

In Examples 31 to 33, tests were carried out with the following representative examples of the compounds which were manufactured in accordance with the invention:

(A)

p-(4,5-epithio-1-cis/trans-ethylidene - 5 - methyl-heptyl)-benzoic acid methyl ester and
p-(4,5-epithio-1-ethyl-5-methyl-hept - 1 - cis/trans-enyl)-benzoic acid methyl ester;

(B)

p-(5-chloro-5-methyl-1-methylene-heptyl) - N,N - diethyl-benzamide and
p-(5-chloro-1,5-dimethyl-hept-1 - cis/trans - enyl) - N,N-diethyl-benzamide;

(C)

p-[5-chloro-1-(cis/trans-ethylidene)-5 - methyl - heptyl]-benzoic acid methyl ester and
p-(5-chloro - 1 - ethyl - 5 - methyl-hept-1-cis/trans-enyl)-benzoic acid methyl ester;

(D)

p-(1,5-dichloro-1-ethyl-5-methyl - heptyl) - benzoic acid methyl ester;

(E)

p-(1,5-dichloro-1,5-dimethyl-heptyl)-benzoic acid methyl ester;

(F)

p-(1,5,9-trichloro-1,5,9-trimethyl-undecyl) - benzoic acid methyl ester;

(G)

p-(5-methyl-1-methylene-hept-4-cis/trans-enyl) - benzoic acid methyl ester and
p-(1,5-dimethyl-hepta-1-cis/trans, 4 - cis/trans - dienyl)-benxoic acid methyl ester;

(H)

p-(5,9-dimethyl-1-methylene - undeca - 4 - cis/trans, 8-cis/trans-dienyl)-benzoic acid methyl ester and
p-(1,5,9-trimethyl-undeca-1-cis/trans, 4-cis/trans, 8-cis/trans-trienyl)-benzoic acid methyl ester.

The designations A through H in Examples 31 to 33 represent the aforementioned compounds.

EXAMPLE 31

A disc of woolen material [7 cm.²] is sprayed with an acetonic active substance solution and, together with an untreated disc of woolen material and a disc of woolen material soaked only with acetone, hung in a cage occupied by 20 young moths of the clothes moth [*Tineola biselliella*]. After 2 weeks, the discs of woolen material are removed and the further development of the eggs laid followed with respect to the sterilant effect and ovicide effect of the test substances.

100% sterilant effect: Larvae emerge from none of the eggs laid on treated and untreated discs of woolen material
100% ovicide effect: Larvae emerge from none of the eggs laid on treated discs of woolen material.

| Active substance concentration, woolen material | Sterilant effect, percent | Ovicide effect, percent |
|---|---|---|
| A— | | |
| $10^{-3}$ | 100 | |
| $10^{-4}$ | 0 | 80 |
| $10^{-5}$ | 0 | 20 |
| B— | | |
| $10^{-3}$ | 0 | 100 |
| $10^{-4}$ | 0 | 100 |
| $10^{-5}$ | 0 | 0 |
| Control with acetone | 0 | 0 |
| Control without acetone | 0 | 0 |

EXAMPLE 32

Filter paper strips [20 cm.²] are sprayed with an acetonic active substance solution and hung in cages each occupied by 5 females and 5 males of the cotton bug [*Dysdercus cingulatus* Fabr.]. The further development of the eggs laid daily is followed with respect to the sterilant effect of the test substance.

100% sterilant effect: Larvae develop from none of the eggs laid on the treated strips, or emerged larvae die in the first larval stage.

| Active substance concentration, $10^{-x}$ g./cm.², paper strips | Sterilant effect, percent |
|---|---|
| C— | |
| $10^{-3}$ | 100 |
| $10^{-4}$ | 100 |
| $10^{-5}$ | 100 |
| $10^{-6}$ | 80 |
| $10^{-7}$ | 30 |
| D— | |
| $10^{-3}$ | 100 |
| $10^{-4}$ | 100 |
| $10^{-5}$ | 60 |
| $10^{-6}$ | 20 |
| $10^{-7}$ | 0 |
| E— | |
| $10^{-3}$ | 100 |
| $10^{-4}$ | 100 |
| $10^{-5}$ | 20 |
| $10^{-6}$ | 0 |
| $10^{-7}$ | 0 |
| F— | |
| $10^{-3}$ | 80 |
| $10^{-4}$ | 30 |
| $10^{-5}$ | 0 |
| $10^{-6}$ | 0 |
| $10^{-7}$ | 0 |
| Control with acetone | 0 |
| Control without acetone | 0 |

EXAMPLE 33

A disc of cotton material [7 cm.²] is drenched with an acetonic active substance solution. 20 freshly laid eggs of the flour moth [*Ephestia kuniella*] are placed on the disc of material, observed for a few days at 25° C. and 90% relative humidity and investigated as to the ovicide effect of the active substance.

100% ovicide effect: No development of the embryos in the eggs laid on discs of material soaked with active substance.

| Active substance concentration, $10^{-x}$ g./cm.², cotton material | Ovicide effect, percent |
|---|---|
| G— | |
| $10^{-3}$ | 100 |
| $10^{-4}$ | 55 |
| $10^{-5}$ | 10 |
| $10^{-6}$ | 0 |
| $10^{-7}$ | 0 |
| H— | |
| $10^{-3}$ | 80 |
| $10^{-4}$ | 40 |
| $10^{-5}$ | 0 |
| $10^{-6}$ | 0 |
| $10^{-7}$ | 0 |
| Control with acetone | 0 |
| Control without acetone | 0 |

We claim:
1. A compound selected from the group consisting of compounds of the formulae:

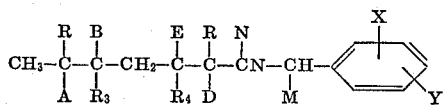

wherein Y is hydrogen or lower alkyl; X is lower alkoxy carbonyl, lower alkenyloxy carbonyl, aryloxy carbonyl, or aralkyloxy carbonyl, R is hydrogen or

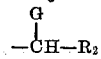

$R_1$ is hydrogen, methyl, ethyl or isopropyl; $R_2$ and $R_3$ are hydrogen or methyl; $R_4$ is hydrogen or lower alkyl; A, D and N are individually hydrogen or halogen; M is individually hydrogen or halogen; and B, E and G are individually hydrogen; and A taken together with B, D taken together with either E or G, and M taken together with N forming a carbon to carbon bond; with the proviso that when X is substituted in the para position and $R_4$ is hydrogen, $R_1$, $R_2$ and $R_3$ taken all together have at least 2 carbon atoms;

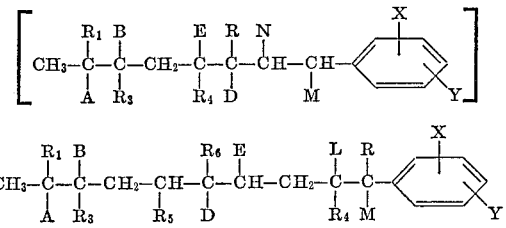

wherein X, Y, R, $R_1$, $R_2$, $R_3$, and $R_4$ are as above; $R_5$ is hydrogen or lower alkyl; $R_6$ is hydrogen, methyl or ethyl; A and D are individually hydrogen or halogen; M is individually hydrogen or halogen; B, E, G and L are individually hydrogen; and A taken together with B, D taken together with E, and M taken together with L or G form a carbon to carbon bond; and

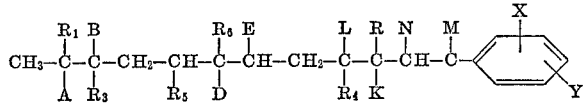

wherein X, Y, R, $R_1$, $R_2$, $R_3$, $R_4$, $R_5$ and $R_6$ are as above; A, D, N and K are individually hydrogen or halogen; M is individually hydrogen or halogen; B, E, G and L are individually hydrogen; and A taken together with B, D taken together with E, K taken together with either L or G, and M taken together with N form a carbon to carbon bond.

2. The compound of claim 1 wherein X is lower alkoxycarbonyl.

3. The compound of claim 2 wherein the compound contains at least one halo group in the aliphatic side chain.

4. The compound of claim 3 wherein said compound is p-(1,5,9-trichloro-1,5,9-trimethyl-undecyl) - benzoic acid methyl ester.

5. The compound of claim 2 wherein said compound is p-(5,9-dimethyl-1-methylene-undeca - 4 - cis/trans,8-cis/transdienyl)-benzoic acid methyl ester.

6. The compound of claim 2 wherein said compound is p-(1,5,9 - trimethyl-undeca - 1 - cis/trans,4-cis/trans,8-cis/trans-trienyl)-benzoic acid methyl ester.

References Cited
UNITED STATES PATENTS 3,578,699  5/1971  Sorm et al. _____ 260—476 R

OTHER REFERENCES

Biological Bulletin; vol. 34, 1968; Sorm et al.
Chem. Abs., vol. 70, 1969; col. 94376 X; Sorm et al.

LORRAINE A. WEINBERGER, Primary Examiner

R. S. WEISSBERG, Assistant Examiner

U.S. Cl. X.R.

260—327 E, 340.9, 348 A, 348.5 L, 473 R, 515 R, 558 R, 558 D, 599, 618 D, 650 R; 424—275, 278, 308, 324